April 20, 1965   F. O. JONES, JR., ETAL   3,179,173
WATER BASE FRACTURING LIQUID
Filed Dec. 6, 1961
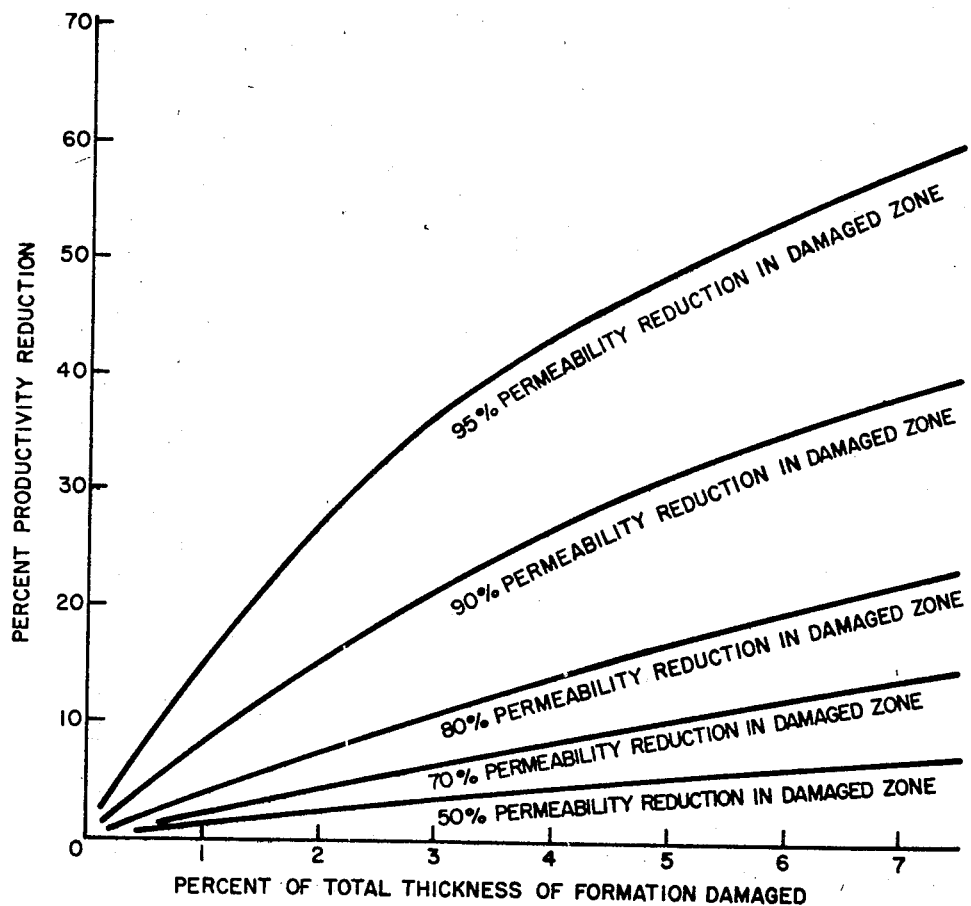
FRANK O. JONES JR.
CLARENCE R. FAST
INVENTORS:
BY [signature]
ATTORNEY:

United States Patent Office 3,179,173
Patented Apr. 20, 1965

3,179,173
WATER BASE FRACTURING LIQUID
Frank O. Jones, Jr., and Clarence R. Fast, Tulsa, Okla., assignors to Pan American Petroleum Corporation, Tulsa, Okla., a corporation of Delaware
Filed Dec. 6, 1961, Ser. No. 157,492
10 Claims. (Cl. 166—42)

The present invention is concerned with the hydraulic fracturing of underground formations. More particularly, it relates to an improved aqueous fracturing liquid having a substantially reduced tendency to damage the permeability of water-sensitive formations.

One of the desirable characteristics of a good fracturing liquid is that it can be delivered at a remote point in the system without appreciable loss of energy. The efficiency with which such liquids perform this work, however, is hampered by the loss of energy in the system caused to a great extent by hydraulic friction. The use of a low-viscosity liquid, such as water, for fracturing has the advantage that losses resulting from hydraulic friction in the system before the water reaches the formation, are held to a minimum.

Nevertheless, the use of water or aqueous base liquids in fracturing operations raises some serious problems. For example, such liquids can permanently damage the fractured formation by reducing the permeability thereof. Permeability damage of this sort is frequently caused through dispersion of clay particles by water. In some cases the formation can become almost completely plugged. This reduction in permeability of the formation is caused from the flow channels therein becoming obstructed by clays or other mineral fines dispersed by the fresh water. Experimental evidence shows that the dispersed particles bridge, to partially dam interstices in the rock. It is known that this phenomenon, hereafter referred to as "clay blocking," is not encountered when the fracturing water has a high salt content. If clays are exposed, for instance, to a 50,000 p.p.m. sodium chloride solution, permeability is not reduced; however, when exposed to solutions weaker than about 5,000 p.p.m., clay dispersion causes loss of permeability. On the other hand, if clays are exposed, for example, to a comparably strong calcium chloride solution, subsequent exposures to a dilute salt solution, containing calcium chloride, or even distilled water, results in relatively little permeability damage, i.e., dispersion of clays.

The explanation for such behavior lies in the fact that—

(1) Clays are cation exchange or base exchange materials similar, in this respect, to zeolites or exchange resins, and
(2) Clays in the calcium exchange form do not disperse easily in fresh water, while clays in the sodium form disperse very easily in such water.

The base exchange form of a clay is easily altered by flowing another solution through it. A sodium clay, for example, can be changed to a calcium clay simply by passing a calcium chloride solution through the clay bed.

While a formation containing oil can ordinarily be fractured by the use of water, investigations have shown formation damage to be extensive when the fracturing liquid is incompatible therewith and that post-fracturing well productivity can be seriously affected. If, for example, the permeability adjacent the fracture is reduced 90 percent and this damaged zone invades only 2 percent of the formation thickness, the reduction in post-fracturing well productivity would be about 15 percent. This phenomenon is further demonstrated by reference to the plots in the accompanying drawing. From these curves it is seen that the more completely the formation is blocked, and the deeper the damaged zone, the greater the reduction in productivity. In highly permeable formations the extent the fracturing liquid invades the formation may be the controlling factor in productivity reduction. Also, it will be observed that while the loss of permeability aids the creation of a fracture for a substantial distance from the well, such procedure is very inefficient because of the marked decrease in subsequent productivity.

Accordingly, it is an object of our invention to provide a water-base fracturing liquid having good hydraulic fracturing properties with low fluid loss characteristics and at the same time causing minimum dispersion of water-sensitive clays so that the harmful effects of clay blocking can be avoided. It is another object of our invention to provide an aqueous fracturing liquid having the properties just mentioned and in which the divalent cation salt content is at least about 5 percent of the dissolved salts contained therein.

We have found that formation damage resulting from clay blocking or similar causes can be, in large part, overcome through the use of an aqueous fracturing liquid containing dissolved salts of which at least about 5 percent are divalent cation salts. Tests with cores capable of clay blocking have shown that if an aqueous solution containing dissolved salts, at least 5 percent of which are divalent alkaline-earth cation salts, e.g., magnesium or calcium salts, is employed as the fracturing liquid, permeability losses are prevented when the formation likewise has a similar proportion of divalent cations. However, even if the formation contains only sodium salts so that the clays are natively in the sodium form, the addition of such divalent cation to the fracturing liquid lessens permeability damage considerably even though the formation clays tend to generate sodium solution at the expense of the aforesaid divalent cation by base exchange. In such a case, however, it would be desirable to add a larger proportion of divalent cations.

Generally speaking, the optimum treatment for any given case can be established from an analysis of the fracturing water. A suitable divalent alkaline earth salt, such as, for example, magnesium chloride or calcium chloride, may be added in sufficient amount to bring the concentration thereof up to at least about 5 percent of the total dissolved salts. For example, 100 p.p.m. sodium chloride solution would require 5 p.p.m. calcium chloride. Where the fracturing water or formation water contains sulfate ions in a concentration sufficient to limit the solubility of the calcium ions below the desired level, a more soluble salt, such as magnesium chloride, should be added. In most instances fracturing water containing from about 250 to about 300 p.p.m. divalent cation salts is satisfactory since such concentration of said cation salts would be suitable for fresh water containing up to about 3000 p.p.m. total solids. Ordinarily, a fresh water having a total solids concentration in excess of about 3000 p.p.m. would not require further treatment because its high ionic strength would tend to prevent appreciable clay dispersion by suppressing formations of the electrical double layer essential to colloidal dispersion of clay.

The process of our invention operates most efficiently to prevent objectionable clay damage when the formation also contains divalent cations, since the clays under such conditions remain in the divalent cation exchange form at all times. When the formation water contains little or no divalent cation, the latter will tend to be stripped from the fracturing liquid as it flows in the formation. Under such conditions, it is desirable to increase the alkaline earth divalent cation content of the fracturing liquid for use in water-sensitive formations. Since overtreatment of the water in this respect causes no harm, as much as 2000 p.p.m. of the divalent cation can be added to the fracturing water without exceeding a chemical treating cost of 1 cent per barrel.

In conducting the process, care should be exercised to see that the pH of the fracturing water does not substantially exceed 7 because higher pH levels interfere with the solubility of the alkaline earth salts. Thus, if fracturing water is found to be alkaline, sufficient acid, such as a mineral acid, for example, sulfuric acid, phosphoric acid, or hydrochloric acid may be added in an amount necessary to reduce the pH of the system down to a value of 7.0 or less.

It is also preferable in employing the process of our invention to add a suitable fluid-loss material so that the divalent cation content of the water will remain substantially unaffected. As examples of fluid-loss agents which may be used in carrying out our invention, there may be mentioned guar gum—silica flour mixture, starch or starch plus bentonite, and the like. If bentonite is used, it should be pretreated by dispersing it, for example, in a calcium chloride solution to saturate its base exchange sites. For instance, dispersing the bentonite in a 10,000 p.p.m. calcium chloride solution would be a practical way to introduce both the bentonite and the calcium into the system. Bentonite when converted, for example, to the calcium form, serves as an effective fluid-loss control agent when used in combination with starch. By the use of these additives, it is possible to reduce the fluid lost to the formation to less than about 50 percent.

Generally, these fluid-loss materials should be added to the fracturing water in an amount corresponding to from about .2 to about 2 pounds per barrel. In the case of the starch-bentonite mixture, these two materials are usually employed in about equal amounts. A typical fracturing water treated in accordance with our invention contains 1,500 p.p.m. total solids, 300 p.p.m. calcium chloride, and one pound per barrel of a starch-bentonite fluid-loss agent. The pH of the liquid before use is 6.5. To demonstrate the ability of the solutions contemplated by our invention to cause minimum permeability damage when used in fracturing water-sensitive formations, the table below is included. In this work, tests were conducted through a core of the particular formation under investigation at known pressure differentials and at measured flow rates. Pressure gradients varied from 2 to 50 p.s.i. per inch. Test solutions were filtered through fine, fritted glass disks to prevent plugging the cores by suspended solids in the liquid. In the first 4 tests shown, the core used was from the Paluxy formation while the last three tests were on a Berea sandstone.

Table

| Test No. | NaCl in Solution, p.p.m. | CaCl$_2$ in Solution, p.p.m. | Permeability, Millidarcy |
| --- | --- | --- | --- |
| 1 | 51,000 | 6,950 | 120 |
| 2 | 51 | 7 | 73 |
| 3[1] | 58,500 | | |
| 4 | Distilled Water | | 19 |
| 5[2] | 52,600 | 5,500 | 220 |
| 6[2] | 105 | 11 | 38 |
| 7[2] | 585 | | 6 |

[1] Purpose was to change clays in core to sodium form—permeability not measured.
[2] Berea sandstone core. In tests 5 and 6 the salt concentration of the solution was decreased abruptly from 58,100 p.p.m. to 116 p.p.m. In test 7 no divalent cation was added.

From the information in the above table it can be seen that by the use of about 12 percent divalent cation in Test No. 2 approximately 60 percent of the original permeability (120 md.) was retained. On the other hand, after treatment of the same core with a 58,100 p.p.m. sodium chloride solution to convert the clays to the sodium form and then contacting the core with fresh (distilled) water, the permeability of the same core decreased from 120 to 19 md.; a retention of only about 15 percent of the original permeability. A similar situation is shown in the case of the Berea sandstone core. Thus we see that the original permeability to a 58,100 p.p.m. salt solution, about 10 percent of which was divalent cation, was 220 md. With a fresh water containing about 10 percent (11 p.p.m.) of divalent cation, about 17 percent of the original permeability was retained. The advantage of divalent cation in the fracturing liquid insofar as concerns permeability damage is clearly demonstrated by comparing the results obtained in Test No. 6 with those in Test No. 7 where in spite of the fact that the salt concentration was roughly six times that used in Test No. 6 the permeability of the core after treatment with such a solution was six times less than the permeability of the core in Test No. 6.

In connection with the above, it should be pointed out that one of the outsanding features of our invention lies in the fact that in the case of a Berea sandstone core, for example, when about 20 percent of the permeability remains after clay damage, oil permeability will be expected to be restored by at least an order of magnitude faster than when only one or two percent permeability to water remains. The phenomenon is also observed in other water-sensitive formations.

We claim:
1. In a process for hydraulically fracturing a subterranean fluid-containing water-sensitive clay formation penetrated by a well with a fresh water base fracturing liquid containing total dissolved salts of less than about 3,000 p.p.m., the improvement which comprises adjusting the salt concentration of said liquid so that the dissolved divalent cation salt content is at least about 5 percent of the total dissolved salts, applying to the resulting liquid sufficient pressure to force it into said formation and to fracture the latter, and thereafter producing said well.

2. The process of claim 1 in which the divalent cation salts are selected from salts of the alkaline earth metal group.

3. The process of claim 2 in which the alkaline earth metal salts are selected from the group consisting of water-soluble calcium and magnesium salts.

4. The process of claim 3 in which the pH of the fracturing liquid is first adjusted to a valve not in excess of about 7.0.

5. The process of claim 2 in which a fluid loss reducing agent is employed.

6. The process of claim 5 in which the fluid loss reducing agent is a mixture of starch and bentonite.

7. The process of claim 5 in which the fluid loss reducing agent is a mixture of guar gum and silica flour.

8. In a process for hydraulically fracturing a subterranean fluid-containing water-sensitive clay formation penetrated by a well with a fresh water base sodium ion-containing fracturing liquid and having a total dissolved salts content of less than about 3,000 p.p.m., the improvement which comprises adjusting the salt concentration of said liquid so that the dissolved divalent cation salt content is at least about 5 percent but not more than a minor amount of the total dissolved solids, regulating the pH of said liquid to a value not in excess of about 7.0, pumping the resulting liquid into a confined zone in said well opposite said formation, increasing the pressure on said resulting liquid until a formation fracture is indicated, and thereafter producing said well.

9. The process of claim 8 in which a fluid loss reducing agent is employed.

10. The process of claim 2 in which said divalent cation salts are present in an amount of from at least about 5 percent, but not more than about 12 percent.

References Cited by the Examiner

UNITED STATES PATENTS

| | | | |
|---|---|---|---|
| 2,672,935 | 3/54 | Braunlich et al. | |
| 2,802,783 | 8/57 | Weiss et al. | 252—8.5 |
| 2,841,222 | 7/58 | Smith | 166—42 |

OTHER REFERENCES

Coulter, A. W.: "Chemical Additives Improve Fracturing," World Oil, Feb. 1, 1957, page 148. (Copy in Scientific Library, Div. 49, 166-HF.)

CHARLES E. O'CONNELL, *Primary Examiner.*